United States Patent
Wälchli et al.

(10) Patent No.: US 7,305,888 B2
(45) Date of Patent: Dec. 11, 2007

(54) OPTICAL INTERFEROMETRIC PRESSURE SENSOR

(75) Inventors: Urs Wälchli, Chur (CH); Per Björkman, Pålsböle (FI); Heikki Saari, Espoo (FI); Jarkko Antila, Helsinki (FI); Hansjakob Hanselmann, Oberschan (CH); Martin Wüest, Malans (CH)

(73) Assignee: Inficon GmbH, Bad Ragaz (CH)

( * ) Notice: Subject to any disclaimer, the term of this patent is extended or adjusted under 35 U.S.C. 154(b) by 0 days.

(21) Appl. No.: 11/497,226

(22) Filed: Aug. 1, 2006

(65) Prior Publication Data

US 2007/0089524 A1    Apr. 26, 2007

Related U.S. Application Data

(60) Provisional application No. 60/707,770, filed on Aug. 12, 2005.

(51) Int. Cl.
 *G01L 9/12* (2006.01)
(52) U.S. Cl. .......................................... 73/714; 73/718
(58) Field of Classification Search .................. 73/724, 73/718
See application file for complete search history.

(56) References Cited

U.S. PATENT DOCUMENTS

| | | | | |
|---|---|---|---|---|
| 5,188,780 A | * | 2/1993 | Lange et al. | 264/660 |
| 5,315,877 A | * | 5/1994 | Park et al. | 73/724 |
| 5,436,795 A | * | 7/1995 | Bishop et al. | 361/283.4 |
| 6,017,645 A | * | 1/2000 | Tailhades et al. | 428/822.1 |
| 6,528,008 B1 | * | 3/2003 | Bjoerkman | 264/650 |
| 6,591,687 B1 | * | 7/2003 | Bjoerkman et al. | 73/724 |
| 7,107,855 B2 | * | 9/2006 | Bjoerkman | 73/724 |
| 7,140,085 B2 | * | 11/2006 | Bjoerkman et al. | 29/25.42 |
| 2003/0118802 A1 | * | 6/2003 | Bjoerkman | 428/220 |
| 2004/0012942 A1 | * | 1/2004 | Bjoerkman et al. | 361/807 |

* cited by examiner

*Primary Examiner*—Andre J. Allen
(74) *Attorney, Agent, or Firm*—Notaro & Michalos PC

(57) ABSTRACT

A vacuum measuring cell has a first housing body and a membrane, both of $Al_2O_3$ ceramic or sapphire. The membrane is planar with a peripheral edge joined by a first seal to the first housing body to form a reference vacuum chamber. A second housing body of $Al_2O_3$ ceramic or sapphire opposite the membrane, is joined to the peripheral edge of the membrane by a second seal to form a measurement vacuum chamber. A port connects the vacuum measuring cell to a medium to be measured. At least in the central area of the first housing body, an optical transparent window is formed and at least the central region of the membrane has an optically reflective surface. Outside the reference vacuum chamber, in opposition to and at a distance from the window, an optical fibre is arranged for feeding in and out light onto the surface of the membrane.

24 Claims, 6 Drawing Sheets

Atmosphere

High vacuum

OPTICAL INTERFEROMETRIC PRESSURE SENSOR

INCORPORATION BY REFERENCE

The present application claims priority under 35 U.S.C. 119(e) to U.S. Provisional Application Ser. No. 60/707,770 filed on Aug. 12, 2005, which is incorporated here by reference.

FIELD OF THE INVENTION

The invention relates to a optical diaphragm gauge for measuring high vacuum pressure in a wide pressure range.

DESCRIPTION OF THE RELATED ART

Semiconductor industry manufactures semiconductor parts using among other techniques chemical vapor deposition (CVD), physical vapor deposition (PVD), implant and (dry) etch processes. Typical pressure ranges of process in the semiconductor industry and pressure ranges of vacuum gauges are shown in FIG. 1a. As shown in FIG. 1a those processes operate typically from $10^{-4}$ to 10 mbar. Typical process gauges for these applications are capacitance diaphragm gauges.

The market demand for high-temperature diaphragm gauges is expected to grow in the coming years mainly due to the introduction of atomic layer deposition (ALD) to semiconductor manufacturing processes, which requires pressure measurements of up to 300° C. or potentially even higher in specific applications. The tool construction for ALD processes is very similar to that of LPCVD or CVD tools, which today are major customers for high-temperature capacitance diaphragm gauges (CDGs) up to 200° C.

A capacitance diaphragm gauge (CDG) is based on the elastic deformation of a thin diaphragm which is suspended above a solid body and separates two volumes. A change in the pressure of these volumes causes the diaphragm to move. The distance between the housing and the diaphragm changes. At high pressures the diaphragm is deflected stronger than under low pressures (see FIG. 1, FIG. 5 and FIG. 6). Metallic electrodes are put on the gap side of the diaphragm and on base facing the diaphragm. These metal electrodes form a capacitance. A change in gap distance leads to a change in capacitance. The capacitance change is therefore an indicator for the pressure change. This measurement principle is gas type independent.

It is known that pressures or pressure differences can be measured by applying pressure to a thin membrane and measuring its deflection. A known and suitable method for measuring the deflection is to design the membrane arrangement as a variable electrical capacitance where the capacitance change which correlates with the pressure change is evaluated by measurement electronics in the known manner. The capacitance is created by arranging a thin, flexible membrane very close to another surface and by depositing an electrically conductive film on both mutually opposed surfaces or by fabricating them from electrically conductive material. When pressure is applied to the membrane the deflection changes the distance between the two electrodes which leads to an analyzable capacitance change of the arrangement. Sensors of this type are mass-produced from silicon. The flat basic body as well as the membrane often consist entirely of silicon. There are also versions that are made of composite materials such as silicon with a glass substrate. Such sensors can be produced very economically.

However, in vacuum applications pressure sensors of this type are normally usable only for higher pressures in the range of approx. $10^{-1}$ mbar to several bar. High resolution at pressures below $10^{-1}$ mbar is no longer achievable with silicon. One of the reasons for this is that the silicon surface reacts with the environment which impairs the sensitive sensor characteristic. Already water vapor that forms part of normal atmospheric air leads to a corresponding reaction on the surfaces. The problem becomes even more serious when the sensor is used in chemically aggressive atmospheres. For this reason attempts were made to protect such silicon sensors against external influences by passivating the surfaces. Attempts were also made to deposit protective coatings on the surfaces in order to improve the durability and the resistance against chemically aggressive environments as described in DE 41 36 987. Such measures are costly and in the case of mechanically deformable parts such as membranes have only limited success, in particular in highly aggressive media such as fluorine, bromic acid and their compounds which are typically used in vacuum etching processes.

For this reason attempts were made to build vacuum measuring cells entirely from corrosion resistant materials such as $Al_2O_3$. A known arrangement of this type is disclosed in U.S. Pat. No. 6,591,687 which is in its entirety integral part of the present invention.

This capacitive vacuum measuring cell is made entirely out of ceramic, in particular $Al_2O_3$. This results in high corrosion resistance and long-term reproducibility. Only in the areas where sealing is required or where feedthroughs are provided are small amounts of materials other than $Al_2O_3$ used, if the $Al_2O_3$ is not fused without addition of the foreign material. A vacuum measuring cell consists of a first plate-shaped housing body above which a membrane, sealed along its edges, is arranged so that it encloses a reference vacuum chamber. On the side pointing away from the reference vacuum chamber there is a second housing body, also sealed along its edges, so that a measurement vacuum chamber is formed there. This measurement vacuum chamber features a port for connecting the medium to be measured. The surface of the first housing body and the membrane that form the reference vacuum chamber are coated with an electrically conductive film, for example, gold, and constitute the electrodes of the capacitance measuring cell. The electrodes are lead out, for example, through the first housing body or through the sealing area in the edge zones. The essentially parallel electrode surfaces are spaced apart from 2 μm to 50 μm. Sealing of the membrane in the edge zone against the two housings is preferably achieved through welding, for example, laser welding. Highly suitable and simple to use is also a glass brazing material that is corrosion resistant. Another possibility of achieving a sealing bond is to connect the housing parts diffusively, for example, in the green body state in which the objective is to completely avoid material other than $Al_2O_3$.

This measuring cell arrangement essentially allows a symmetric design that avoids all stress in the housing. This is particularly important in order to achieve high measurement sensitivity combined with high accuracy and reproducibility. It also allows the utilization of a very thin ceramic membrane which is essential for reliably measuring vacuum pressures lower than 100 mbar, and in particular lower than 10 mbar, by means of capacitive, all-ceramic measuring cells. For this purpose membrane thicknesses of 10 μm to 250 μm are needed, where membrane thicknesses of 10 μm to 120 μm are preferred in order to achieve a very good resolution. Typical membrane thicknesses are, for example:
- at 1000 Torr: membrane thickness 760 μm±10 μm
- at 100 Torr: membrane thickness 345 μm±10 μm
- at 10 Torr: membrane thickness 150 μm±10 μm
- at 1 Torr: membrane thickness 100 μm±10 μm
- at 0.1 Torr: membrane thickness 60 μm±10 μm
- at 0.01 Torr: membrane thickness 40 μm±10 μm Such thin membranes are very difficult to manufacture and after the sinter step require at least one additional smoothing step. It is also very important for the membrane to be sufficiently helium tight which can be achieved only if the grain size of the membrane material is not too large and remains within the range of <20 μm. Smaller grain sizes of <10 μm are preferred, in particularly those <5 μm. In all cases the cross-section of the membrane viewed across the thickness should contain at least two grains; the membranes are particularly tight if more than five grains are on top of each other.

Another important criterion for achieving an accurate measuring cell is the planarity of the membrane surface. The unevenness across the entire surface should in all cases not exceed 30% of the electrode gap, preferably not more than 15%. This means that the unevenness across the entire surface should not exceed 10 μm, preferably no more than 5 μm. The unevenness is defined here as the difference between the lowest and the highest point. To achieve the desired long-time stability the purity of the aluminum oxide used for the membrane should be at least 94%, with preferred values being above 99%.

To ensure that the quality of the membrane seal in the edge zone is not impaired, it is advantageous to lead out the electrically conductive layers via feedthroughs that are arranged on the first housing body, rather than directly through the membrane seal or fused joint.

To ensure accurate functioning of the measuring cell over a long period of time, the reference vacuum chamber must have a high-quality vacuum with long-time stability. After evacuation a getter should be provided that is preferably arranged in a small volume on the first housing and communicates with the reference vacuum chamber. This getter ensures that the reference vacuum pressure is lower, preferably by at least one decade, than the pressure to be measured. To prevent contaminations of the internal measuring cell space a getter type that is not evaporating should be chosen.

Measuring cells designed like described above can be very compact and economical to produce. The diameter of such a cell can be between 5 and 80 mm where the measuring cell preferably has a diameter of 5 to 40 mm. The thickness of such a cell is preferably in the range of 2 mm to 25 mm.

For manufacturing a functional measuring cell that possesses the aforementioned characteristics the specifications of the corresponding manufacturing process must be closely followed. In particular the manufacture of thin ceramic membranes requires special care. The membrane as well as the complete unit should be entirely free of internal stress.

Suitable $Al_2O_3$ membranes are manufactured, as is usual in the ceramic industry, by first mixing a slurry according to a specific recipe, and by thinly and evenly spreading the doughy mass on a strip shaped carrier material, for example, a plastic foil. After drying these layers are inspected for irregularities such as bubbles or pits. This mass which is not sintered yet is referred to as the green body. The desired membrane shape is cut out of the strip shaped green body material after which the material is still sticking to the plastic foil. For cutting, tools such as knives are used, preferably a laser. Cutting or scoring of the green body requires particular care that no dislocations or warping against the surfaces of the future ceramic membrane occur as this also influences the degree of surface unevenness. If a cutting knife is used, a pressing wheel can be applied on the membrane side which prevents undue warping of the green body. Subsequently the preferably circular cut membranes are separated from the foil strip by drawing off the latter, for example, across an edge. The membranes are subsequently sintered in a furnace.

For sintering the membranes are preferably placed on hard-sintered, flat $Al_2O_3$ plates that can be stacked on top of each other, and sintered typically at 1630° C. The temperature is gradually raised to 1630° C. over a period of approx. 400 minutes which corresponds to a temperature rise of about 4° C. per minute. The temperature is then held for a few minutes at this level, for example, 6 minutes and then slowly decreased at the rate of about 3° C. per minute over 210 minutes to 1000° C., and in a second step with a temperature reduction of about 6° C. per minute over about 170 minutes to room temperature. The result is a ceramic membrane which in contrast to the green body has a hard pure ceramic structure, and the additives of the green body material have evaporated. After this sintering step the membrane is very uneven and at a diameter of 40 mm has a warpage of several millimeters.

In this condition the membrane cannot be used due to the strong warpage and internal stress in the material. The membrane must be smoothed in at least one additional step. For this purpose the membrane is again heated in the furnace. The membrane is carefully sandwiched between massive and highly planar, hard-sintered $Al_2O_3$ plates (also "dead", that is, large-grained $Al_2O_3$) which for a membrane diameter of 40 mm have a weight of several 10 to several 100 grams, or in the example about 60 grams, or are correspondingly weighted down. The temperature is slowly increased at 4° C. per minute over 390 minutes to approximately 1570° C. After a short dwell time of several minutes, approximately 25 minutes at this temperature, the temperature is lowered slowly at approx. 5° C. per minute over approx. 115 minutes until 1000° C. are reached. Subsequently the temperature is lowered at approx. 6° C. per minute over about 166 minutes until ambient temperature is attained. After this smoothing step the membrane has only a very small amount of residual warpage of a few tenths of a millimeter. Important in this smoothing step is that the temperature is not raised as high as in the first sintering process, preferably up to a temperature which is at most 100° C. lower than the sintering temperature. To achieve excellent results required for the measuring cell to be built, this smoothing heating step must be performed at least twice.

For reasons of economy these smoothing steps should be performed in such a way that no more than two such steps are needed. Particularly good results are achieved when the membrane is carefully separated from the plate between heating steps and redeposited in a slightly offset position. Preferably the membrane is even placed upside down. The utilization of a stack of several flat plates with membranes sandwiched in between is particularly economical. After these steps, membranes are now available that have selectable thicknesses in the range of 10 μm to 250 μm, preferably <120 μm. With the process described above membrane planarity's can be achieved that are better than 10 μm across the entire surface, preferably even better than 5 μm. The mean grain size in the membrane material is less than 20 μm, preferably less than 10 μm, and even less than 5 μm is achievable. In this way the requirement that at least 2 grains, preferably at least five grains exist across the thickness, can easily be achieved. In this way helium-tight membranes, as required for vacuum measuring cell applications, can be produced. The membrane is now ready to be used for building the measuring cell.

The membrane as well as a flat surface of the first housing body made of $Al_2O_3$ are now coated with an electrically conductive film for creating the electrodes. For example, a metallic paint, for example a paint containing gold, can be used which, for example, is brushed or sprayed, preferably printed on. Another method is to create the electrically conductive layer by means of evaporation coating, preferably by sputter coating. To allow the deposition of an accurate and defined film it is advantageous if, for example, a gold layer that initially is deposited with a relatively large thickness of about 1 μm, is subsequently thinned down in the inner area to approx. 5 nm by means of an etching process, preferably an ion etching or sputter etching process. In this way a thicker edge area is created which can compensate diffusion losses if, for example, a brazing step is performed. A preferred process that is simple to handle in practice is to first deposit a thin layer of several nm across the entire surface and subsequently a thicker layer of gold at the edge by means of screen printing (that is, a combination process and different film thicknesses). Membranes or housings processed in such a way are subsequently tempered at temperatures of several 100° C., preferably in the range of 650° C. With going up to 850° C. even better results can be achieved provided adequate selection of the coating and bonding material takes place.

The second ceramic housing which is arranged on the measurement side consists of a flat ceramic plate which on the membrane side can have a flat recess in order to form a sufficiently large vacuum chamber. The connection port is connected to this ceramic housing by means of brazing, bonding or gluing, preferably by means of glass brazing, in such a way that the connection opening can communicate with the future measurement vacuum chamber.

In the peripheral area where the seal is created the membrane is coated on both sides with a glass paste, preferably by means of screen printing. After drying the membrane with the glass paste is baked in an oven at several 100° C., preferably at about 670° C. Subsequently the glass surface is polished on both sides and thereby preferably also the future electrode spacing is defined.

With the aid of said coating process the upper ceramic housing on the electrode side can on the external surface additionally be coated with an electrically conductive film in order to achieve shielding. Also here the connection points are formed on the housing. In an additional step the drill holes for the electrical feedthrough of the electrode connections are metallized, preferably with silver.

In a test phase the first housing with the electrode and the feedthroughs, together with the deposited membrane, is checked for tightness and for correct electrode distance. Subsequently the lower housing part is mounted and the entire assembly is loaded with weight in order to test the function and distances. In a mounting frame the getter connection may additionally be mounted and under a load weight of about 200 grams the glass seals are baked at several 100° C., preferably about 630° C. Subsequently a test is performed to check that the required distances are maintained. If necessary the membrane spacing can be corrected through additional weight loading or relieving and an additional firing process. The sealing process must be executed very carefully and as mentioned, no stress should occur in the measuring cell arrangement. Alternatively also direct bonding can be used in place of glass or other sealants, preferably laser bonding.

This known capacitive measuring cell arrangement are described schematically based on the following illustrations which serve as examples:

The capacitive measuring cell made of $Al_2O_3$ with a structure essentially symmetrical about the membrane is illustrated by the cross-section in FIG. 1. The first housing (1) consists of a ceramic plate made of $Al_2O_3$ which along its edges is tightly bonded at a distance of 2 μm to 50 μm relative to the ceramic membrane 2 and which encloses a reference vacuum 25. The distance between the two surfaces is usually established directly during the assembly by means of the sealing material 3 located between the membrane edge and the housing. In this way a completely plane housing plate 1 can be used. In the same way a measurement vacuum chamber 26 is formed in a second housing 4 on the opposite membrane side; this vacuum chamber is accessible for the media to be measured via a connecting port 5 through an opening in the housing 4.

FIG. 2 shows an enlarged cross-sectional detail of the edge zone of a measuring cell. The seal 3 on both sides of the membrane 2 defines, as mentioned above, the distance of the two housings 1 and 4. This seal consists, for example and preferably, of glass paste that is easy to handle and can, for example, be applied by means of screen printing. In a typical measuring cell with an external diameter of 38 mm and a free internal membrane diameter of 30 mm the distance 3 is approx. 2 to 50 μm, preferably 12 to 35 μm. In this example the first housing 1 has a thickness of 5 mm, the second housing 4 a thickness of 3 mm. The inner area of the second housing 4 is preferable designed with an approx. 0.5 mm deep recess, as shown in FIG. 1, in order to enlarge the measurement vacuum chamber 26. On the reference vacuum side the membrane 2 and the housing 1 are each coated with an electrically conductive film 7. These two films are not electrically interconnected. Films 7 can, for example, be painted on, printed on, sprayed on, or be deposited by means of a vacuum process. Preferably they are deposited by a vacuum process such as by evaporation coating or sputtering. Particularly suited as a film material is gold, which is deposited, for example, with a film thickness of 1 μm and is subsequently thinned down to a few nanometers, preferably to 5 nm, by means of sputter etching. In this way the film thickness can be defined so that it is thin enough and is free of stress. The electrical connections of the membranes 7 are preferably established with vacuum-tight, electrically conducting feedthroughs 6, preferably through the housing 1 where they can subsequently be connected to the evaluation electronics.

The evacuation line which leads through the first housing plate 1 and the getter arrangement are not shown in FIG. 2.

In order to maintain a stable reference vacuum for a long period of time in reference vacuum chamber 25, a getter 10 is provided, as shown in FIG. 4. This getter is preferably a non-evaporating type getter in order to keep any particles out of the reference vacuum chamber 25. The housing 1 includes a getter chamber 13 formed therein for containing getter 10; getter chamber 13 connects via connection line 14 to reference vacuum chamber 25. A vacuum pump is connected to the reference vacuum chamber 25. The connection 14 and the volume 13 for accommodating getter 10 are closed by cover 8; cover 8 is preferably made of metal or ceramic material. Reference vacuum chamber is evacuated so that getter 10 is activated and de-gassed. After evacuation, cover 8 is sealed to housing 1 with sealing material 9.

The sealing material can, for example, be glass brazing material. Spring 11 presses getter 10 against cover 8 and ensures that getter 10 is in good thermal contact with the cover 8.

Another version of a getter arrangement is illustrated in FIG. 4 where a contacting agent 12, preferably a brazing material, is placed between getter 10 and cover 8 in order to achieve better thermal contact. Excellent thermal conductivity is required here so that the getter 10 can be thermally activated via the cover 8 from the outside. In addition this getter arrangement allows activation of the getter and subsequent brazing of the cover 8 in a single work step, provided the activation temperature of getter 10 and the brazing temperature of the brazing material 9 are essentially the same.

A measuring cell based on the above described concept was realized as a product and sold already in big numbers is shown in the following FIG. 5 as an example.

However, in practical applications there are still various problems with measuring pressure of vacuum with capacitance diaphragm vacuum gauges.

In the semiconductor and coating industry the sensor is exposed to hot and corrosive gases. Some of these process gases and very often the products from processes tend to condense on colder surfaces. In order to prevent or reduce condensation, the diaphragm gauges are heated such that the membrane exposed to the process has a higher temperature than the process gas, so that the gases preferably condense somewhere else in the system but not at the sensitive membrane. This is done because thin film growth on the membrane leads to thin film stress on the membrane, which leads to compressive or tensile stress on the membrane and therefore to sensor drift. Sometimes the entire process tool is heated so that hardly any condensation can take place at all.

Capacitance measurement is a very sensitive and a very long time stable measurement technique, but is also very susceptible to electromagnetic interferences (EMI). Therefore, the front end electronics such as preamplifiers or capacitance to frequency converters are preferably placed very close to the capacitive element.

Process and environment temperatures of 300° C. and higher are a challenging requirement for any electrical system. Typically, electronics are specified to an environment temperature of 80° C. or in special applications such as military up to 120° C.

For temperatures at 200° C. remote type CDGs (heated sensor and electronics separated by a cable) are standard. Such solutions suffer from problem of the Capacitive Measurement over the temperature gradient, as the connecting cables are part of the sensitive capacitance measurement region, that exists between the sensor head and the electronics and they also suffer from the higher susceptibility to EMI (Electro Magnetic Interference). In practice both effects deteriorate the qualities of the CDG in an unwanted way.

SUMMARY OF THE INVENTION

The optical diaphragm gauge (ODG) design eliminates these major disadvantages of the CDG design. The pressure depending deflection of the diaphragm is measured by an optical system in the sensor and the measured signal is then transported by means of an optical fiber to the optical signal conditioner unit, which subsequently converts the optical signal into an electrical signal. This signal can be transported over long distances (even kilometers) without signal degradation and without being influenced by environmental disturbances, mainly electromagnetic noise, vibrations and ambient temperature changes.

Optical diaphragm gauges have been described in the literature (e.g. Lopez-Higuera, 2002; Totsu et al., 2003). Such an instrument is basically a diaphragm gauge. The readout of the gauge is done by optical means. There are many optical techniques available to measure the distance between a two parts. However in practical pressure measurement where distances in the range of a tenth of an Angstrom ($10^{-10}$ m) to a millimeter must be measured, mainly Fabry-Perot principles are used. Primary applications have been chemical process monitoring and biomedical applications. These sensors are typically operated at pressures above atmospheric pressures.

Optical methods for the measurement of the membrane displacement at temperatures up to 550° C. have been realized in some commercial products like Luna Innovations Fiber Optic Pressure Sensor using external Fabry-Perot Interferometry. Sensors by Taitech, FISO Technologies of Davidson Instruments are using Silicon MEMS technology.

Light of a lamp is guided into a glass fiber. The light is guided to the sensor head and passes a semireflective mirror onto a second mirror on the membrane. The reflected light passes again through the reflective mirror is focused into a glass fiber and led to the interferometer.

The inventive ODG—sensor arrangement has its base in the CDG sensor made of alumina. Basically this alumina sensor concept is further development to allow optical readout of the membrane deformation. It has be found that this combination of the alumina sensor concept with the optical read out principle based on the Fabry-Perot technology leads to outstanding results.

DETAILED DESCRIPTION OF THE PREFERRED EMBODIMENTS

Figure 10:
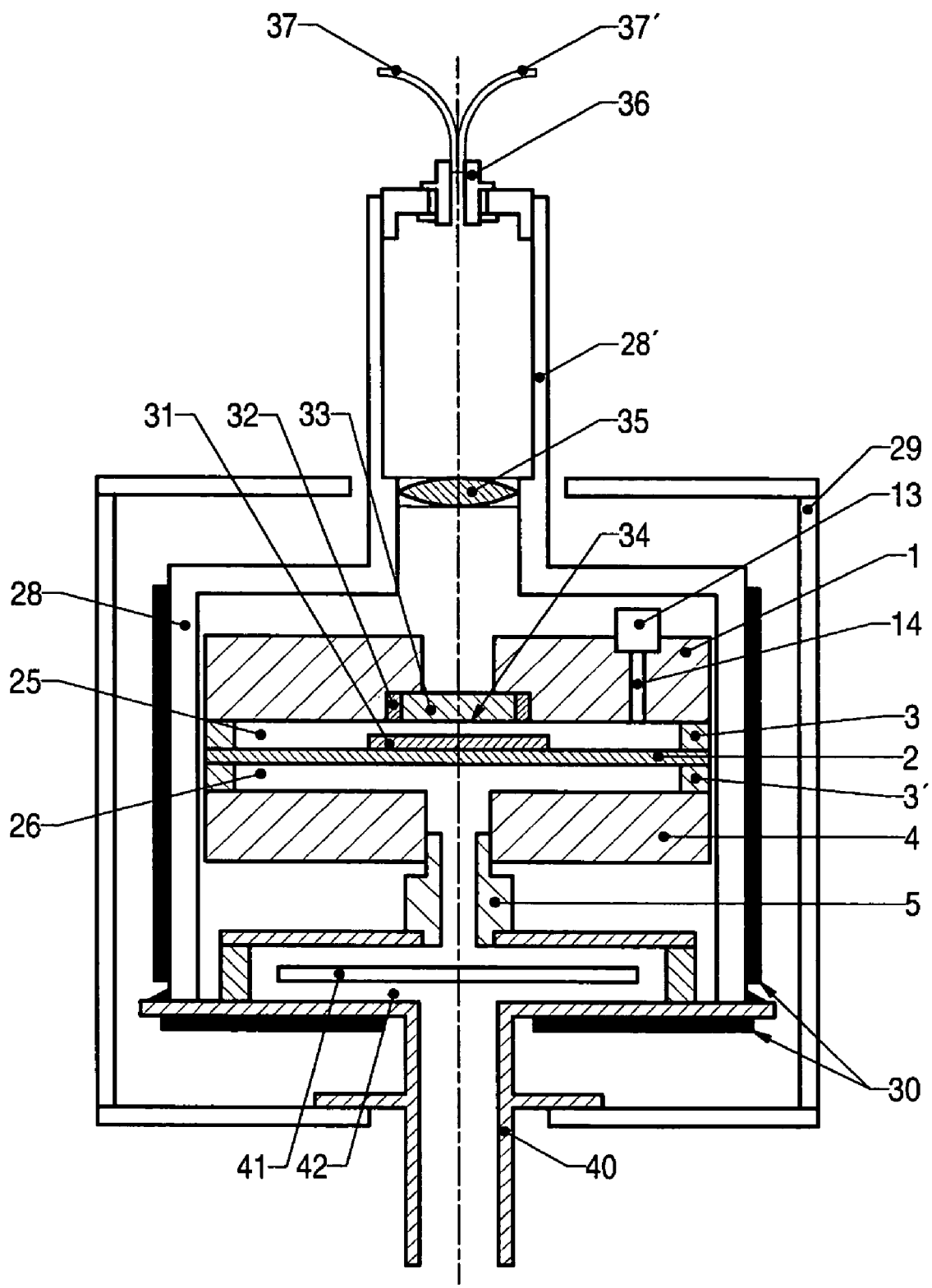
FIG. 10 is a sectional diaphragm of a gauge according to this invention with membrane mirror and double fibre and long focusing distance.

The preferred inventive arrangement of an ODG (Optical Diaphragm Measuring Cell) measuring cell made of $Al_2O_3$ with a structure essentially symmetrical about the membrane is illustrated by the cross-section in FIG. 10. The first housing (1) consists of a ceramic plate made of $Al_2O_3$ which along its edges is tightly bonded at a distance of 2 μm to 50 μm relative to the ceramic 2 and which encloses a reference vacuum chamber 25. The distance between the two surfaces is usually established directly during the assembly by means of the sealing material 3, 3' located between the membrane edge and the housing. In this way a completely plane housing plate 1 can be used. In the same way a measurement vacuum chamber 26 is formed in a second housing 4 on the opposite membrane side; this vacuum chamber is accessible for the media to be measured via a connecting port 5 through an opening in the housing 4.

The seal 3, 3' on both sides of the membrane 2 defines, as mentioned above, the distance of the two housings 1 and 4. This seal consists, for example and preferably, of glass paste that is easy to handle and can, for example, be applied by means of screen printing. The prefusing or sintering temperature of this glass paste is preferably in the range of 675° C. to 715° C. And the sealing temperature is preferably in the range of 600 to 630° C.

Figure 1:
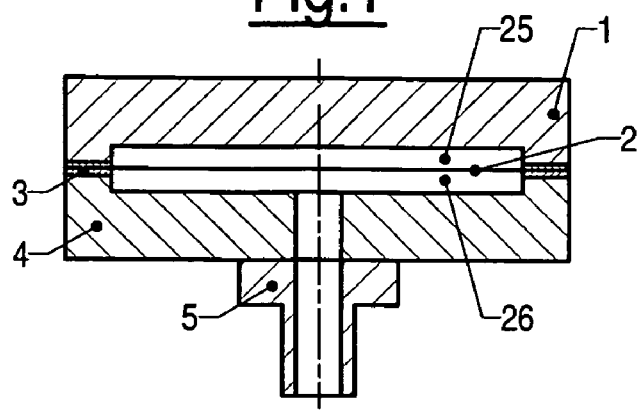
FIG. 1 shows a schematic cross-section of a capacitive vacuum measuring cell of the prior art.
Figure 2:
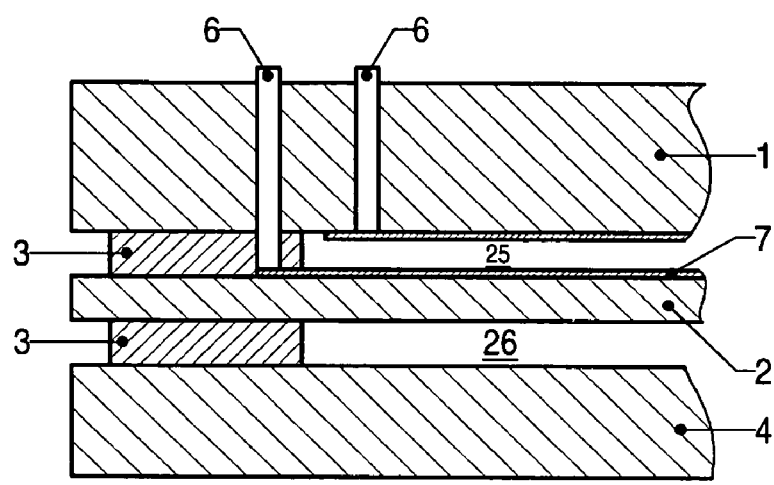
FIG. 2 shows an enlarged cross-sectional detail according to FIG. 1.

In a typical measuring cell with an external diameter of 38 (5-50) mm and a free internal membrane diameter of 30 (4-45) mm the distance 3 is approx. 2 to 50 μm, preferably 12 to 35 μm. In this preferred example the first housing 1 has a thickness of 2 to 10 mm, the second housing 4 the same thickness. The first housing 1 and the second housing 2 must be made of materials having similar expansion coefficients as the used diaphragm materials. Very suitable combinations are high purity alumina ceramics (purity>96 preferably>99.5%), sapphal ceramics (alumina having a purity above 99.9%) and sapphire (single crystal high purity alumina, artificial corundum). The inner area of the second housing 4 is preferable designed with an approx. 0.5 mm deep recess, as shown in FIG. 1, in order to enlarge the measurement vacuum chamber 26.

Figure 9:
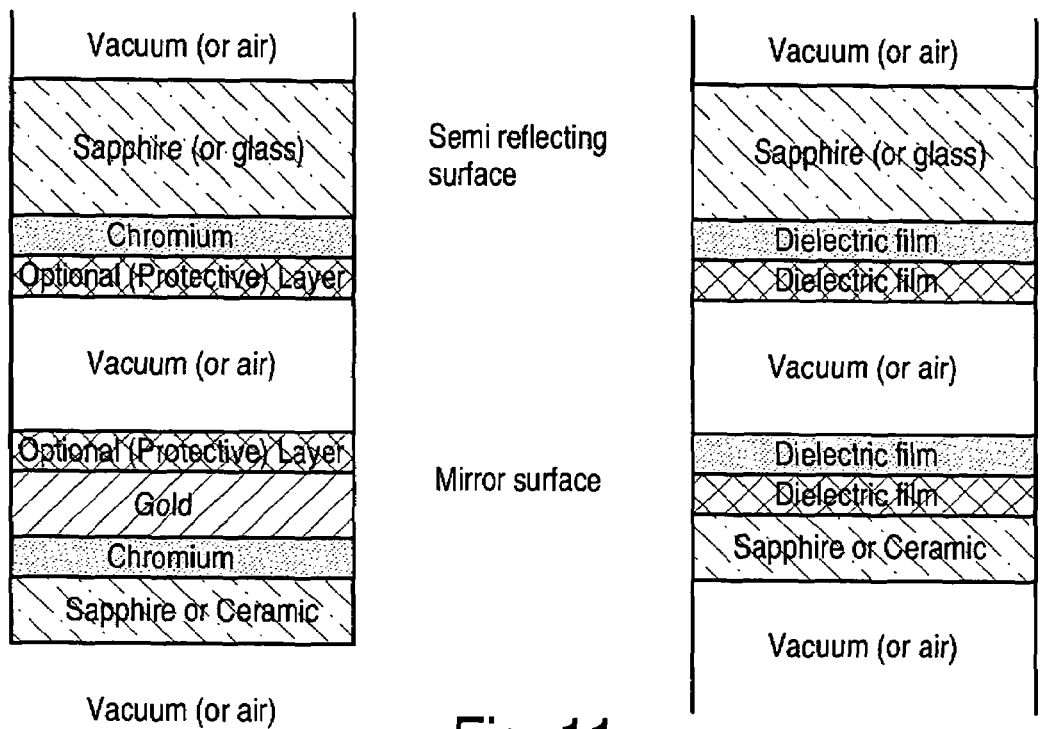
FIG. 9 is a schematic cross-section of a preferred mirror arrangement of the invention.

On the reference vacuum side the membrane 2 is coated with a reflecting film forming a mirror coating 31. There are two ways of coating the diaphragm and the window or the first housing to create the Fabry-Perot interferometer. The principle ideas of coatings that can be used in the Fabry-Perot are well described in the literature (see Vaughan JM, The Fabry-Perot Interferometer, Adam Hilger Bristol and Philadelphia, 2002). In FIG. 9 both principle ways are schematically shown. Either you choose a mainly metallic or a dielectric system. The metallic coatings can be protected by dielectric coatings for easier further processing.

Figure 3:
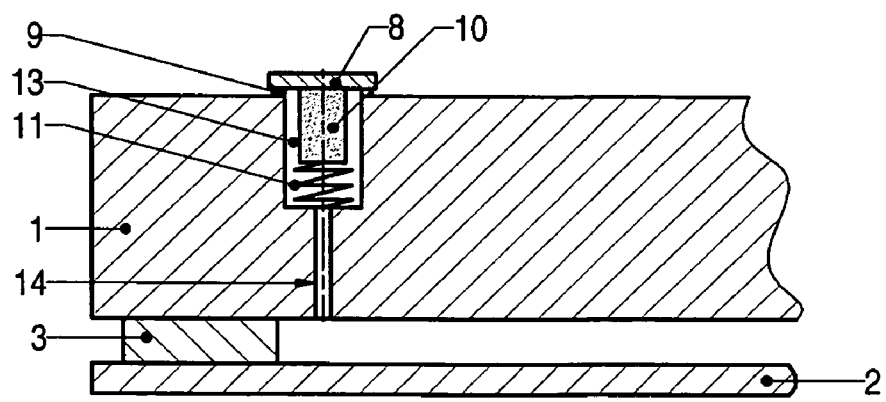
FIG. 3 shows a cross-sectional detail of a getter arrangement of the prior art.
Figure 1A:
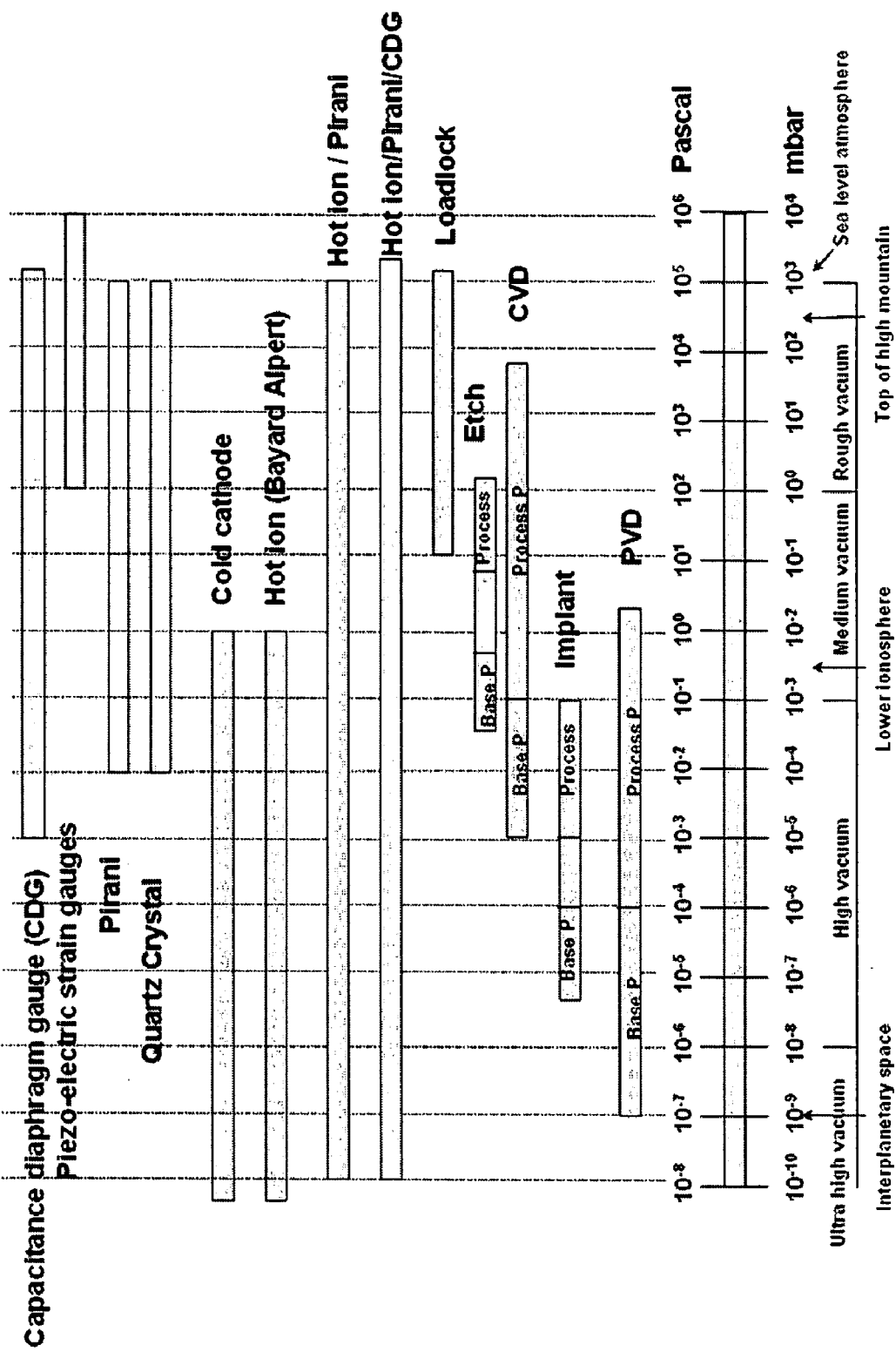
FIG. 1a is a diagram showing typical pressure ranges used of process in the semiconductor industry.
Figure 4:
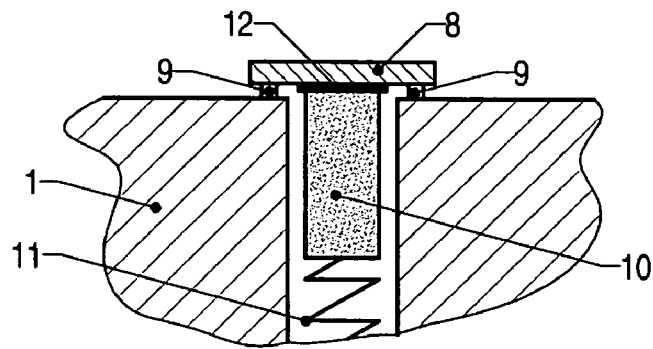
FIG. 4 shows a cross-section of another getter arrangement version of the prior art.
Figure 5:
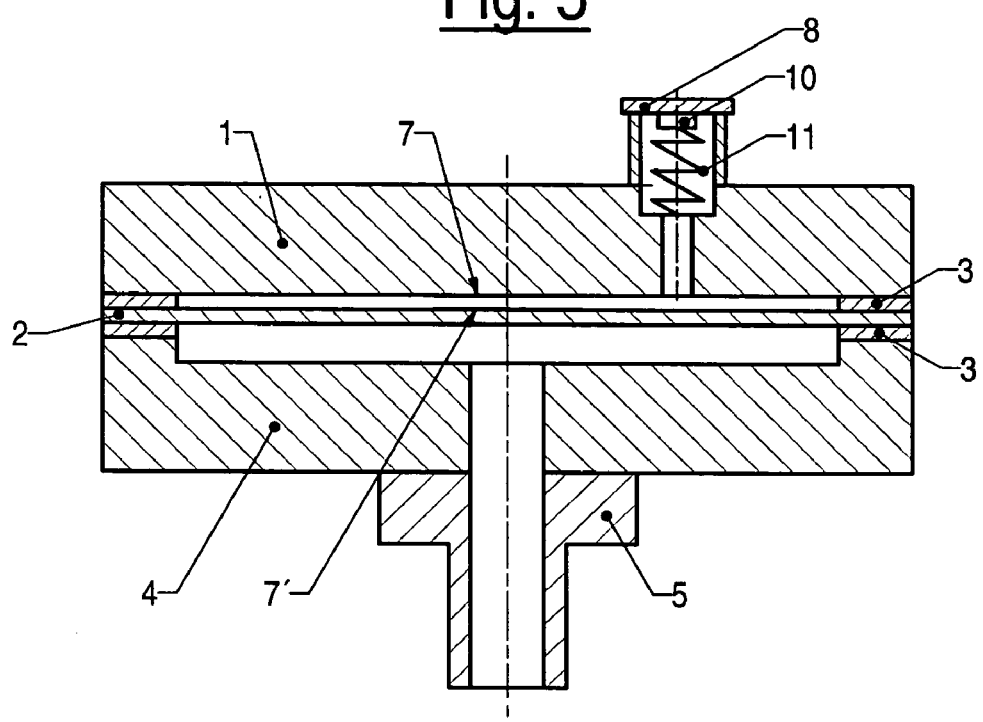
FIG. 5 shows a schematic cross-section of a capacitive vacuum measuring cell together with a getter arrangement as of the prior art.
Figure 6A:
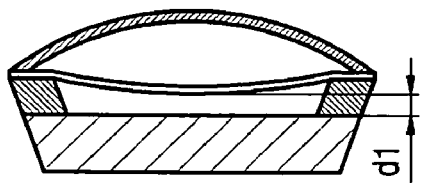
FIGS. 6a, 6b are cross-sectional views of a CDG with deflection of the diaphragm under pressure load.
Figure 6B:
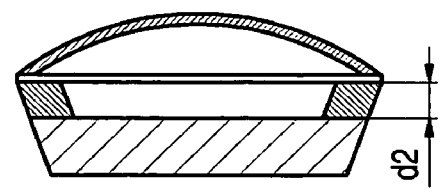
Figure 7:
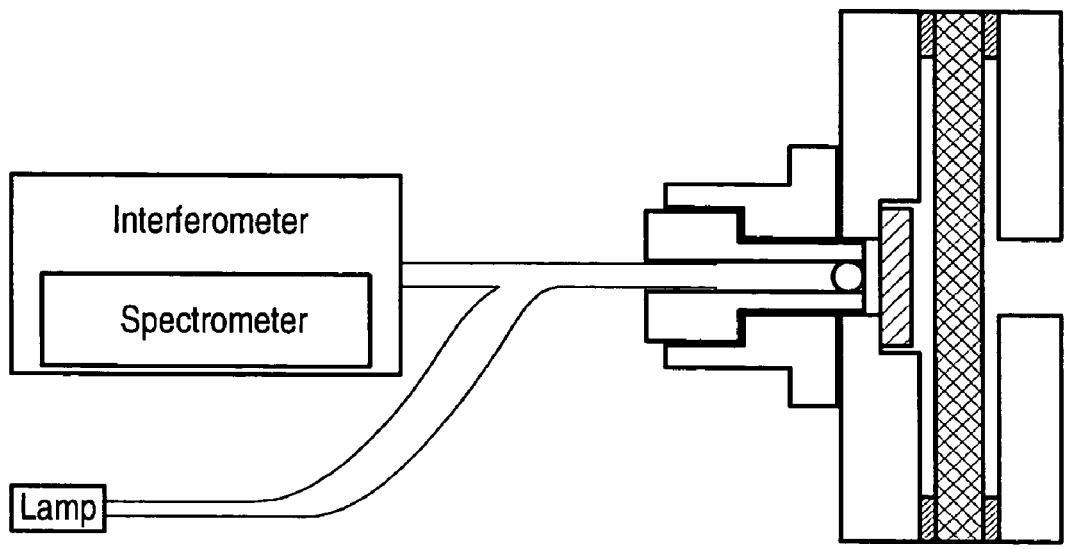
FIG. 7 is a schematic illustration of an interferometric pressure measurement system according to this invention.

The metallic mirror is preferably designed as a fully reflective film. This Films 31 can, for example, be painted on, printed on, sprayed on, or be deposited by means of a vacuum process. Preferably this film contains mainly gold and is deposited by printing and is thickness is in the range of 0.3 μm to 10 μm. An evacuation line 14 leads through the first housing plate 1 and is connecting the reference vacuum chamber 25 with the getter chamber 13 where a getter arrangement wherein a getter 10 is placed which is not shown in FIG. 10. This getter arrangement is identical with the getter arrangement of the already described CDG measuring cell with it's FIGS. 3 and 4.

The first housing body 1 can be made fully of optical transparent material or include in the centre a transparent area forming an inserted optical window 33. An optical system is arranged directly or in distance behind the transparent housing 1 or the window 33 for coupling the Fabry-Perot interferometer to the reflecting surface of the moving membrane to be able to measure the deflection of the membrane 2 depending on the pressure to be measured. The light and the optical signal are feed from the interferometer to the measuring cell by a least one glass fibre 37, 37'. It is advantageous to have coated the inner surface 34 of the transparent Housing 1 or of the Window 33 inside of the reference vacuum chamber in opposition to the mirror 31 of the membrane 2 with a partly transparent film, preferably with a semi-transparent film. This coating must withstand the backing temperature of several hundred ° C. when the measuring cell is mounted and backed together as described before with the CDG mounting procedure. It is most advantageous to use sapphire as transparent housing 1 or window 33 because of the optical behavior and the precision which can be reached. However this material is expensive and the use of an inserted window 33 is cheaper and the angle can be adjusted and optimized for good signal quality of the measuring system. If an inserted window 33 is used then it must be sealed by a seal 32 from the same type as already described above for sealing the membrane 2 with the seals 3, 3'. The seal material consists preferably of baked glass paste by heating up the paste on several hundred degree C.

The preferred measuring cell as shown in FIG. 10 is surrounded by a holder 28 and a heater 30. With this heater 30 the cell can be heated above the condensation temperature of the involved substances of the vacuum process to be measured. The temperature of the cell lays Preferably at least 10° C. above the condensation temperature. An advantageous practical temperature is in the range of 100° C. to 600° C. These chemical substances are often very aggressive and heating is an effective measure to keep it away from sensitive parts of the measuring cell. These measures ensure that the cell is working with high accuracy and high reproducibility during a long term of the executed processes.

With this heated measuring cell arrangement it is important that the optical system like the glass fibre becomes not to hot that it will not be destroyed and that the optical accuracy of the system is not badly influenced. As shown in FIG. 10 this problem can be solved while setting the fibre 37, 37' with its connector in a distance far away enough from the hot measuring cell that at the fibre the temperature is lower than 100° C. For example the fibre can be in a distance of some cm away from the cell hold by a holder 28' like a tube from stainless steel to reduce the temperature. In this case a lens 35 is arranged between the fibre and the housing 1 or the window 33 for optimal coupling the optical signal to the membrane.

The whole measuring cell arrangement can be protected with a cover 29 surrounding it. It is advantageous not to directly expose the measuring port 5 with the measuring vacuum chamber 26 and it's membrane 2 with the process chamber where aggressive conditions exists like plasma discharges, chemicals etc. In this case the port 5 is connected to a flange 40 with the process chamber by a baffle cavity 42 including a protection plate 41 as a baffle.

Membrane:

The advantageous ways to make a part of the reference vacuum side of the membrane reflective to optical light are: one method is to attach a small, thin reflective plate 31 on the alumina membrane. An other method is to evaporate a gold mirror 31 on a sapphire membrane. A chromium layer is placed between the sapphire and the gold to improve the adhesion of gold on sapphire. A further method is to paint it on, print it on or spray it on. The dielectric coatings are put instead or on top of the metallic layers in similar ways onto the membranes.

Sapphire Membranes:

The diaphragm 2 is preferably made of sapphire. Sapphire is defined here as a single crystal aluminum oxide ($Al_2O_3$; artificial corundum) with a definite crystal orientation. Therefore many physical parameters are dependent on direction.

This material choice has many advantages:

It is corrosion resistant to process gases used in the semiconductor industry such as fluorides ($NF_3$, $CH_2F_2$, $SF_6$, $CF_4$, $CHF_3$) and chloride (e.g. $Cl_2$, HCl), bromides (e.g. HBr) gases or water vapor.

Since it is monocrystalline it has a smoother surface than poly-crystalline alumina ceramic. This allows for smoother mirror surfaces.

In addition a smooth monocrystalline surface reduces the number of thin film nucleation sites on the surface. This leads to reduced thin film deposition on the process side of the membrane 2 and therefore to less sensor drift due to slower membrane thin film stress build-up.

It has a high flexural strength. This allows achieving larger deflections with thinner membranes 2, thereby allowing to extend the measurement range of the gauge and to achieve higher accuracy in the very low pressure range.

Measured values in comparison to Aluminumoxide are given in the table as follows:

| Thickness Al2O3 [μm] | Deflection Al2O3 [μm] | Thickness Sapphire [μm] | Deflection Sapphire [μm] |
|---|---|---|---|
| 765 | 5.73 | 706 | 6.46 |
| 150.4 | 264* | 151.6 | 240 |
| 55 | 293* | 44.6 | 413 |

It can be seen that with a sapphire membranes with a thickness below 150 μm a higher deflection can be achieved than with Al2O3 up to the twice. With Al2O3 the deflection in the last two examples (*) the limit of the flexibility even was reached and the membrane was broken.

The membrane 2 is cut out of the sapphire crystal such that the membrane is preferably perpendicular to the C-axis (structural index 0001). This orientation is to allow the greater thermal expansion coefficient to be perpendicular to the diaphragm instead of being perpendicular to it. This choice of axis orientation leads to increased thermal expansion in the vertical deflection and higher sensor drift as function of temperature. This choice is intended to reduce buckling of the thin membrane. The sapphire membrane 2 has a diameter of 5-80 mm with a typical range of 5-40 mm and is 0.04 to 0.76 mm thick with typical values of 0.07 to 1.0 mm to avoid problems with buckling. The top and bottom plane should be parallel to 0.005 mm or better and have a surface roughness of N4 or Ra 0.35 or better in the area of the mirror 31.

Total Reflection Mirror:

The mirror 31 on the reference vacuum side of the membrane 2 is made of noble metals preferably gold. A chromium layer is added to improve the adhesion of gold on sapphire. The sintering temperature for the noble metal coating like gold or silver is up to 850° C.

A single chromium layer might sometime also be sufficient but the reflectivity is reduced. An alternative solution consists out of a single or multilayer dielectric mirror.

First Housing Body:

The first housing body 1 can be made of alumina ceramic or sapphire. A sapphire base is preferred due to the match of the thermal expansion coefficient of the base with the membrane. Due to cost reasons a first housing body made of alumina ceramic is used.

In the housing body a hole is drilled into which the a semireflective mirror is mounted as well as attachment pieces for the optical fibre.

Semitransparent Mirror (FIG. 8, FIG. 9 and FIG. 10):

The choice of semitransparent mirror material on the inner surface 34 of the window 33 was challenging. During the manufacturing process of the cell, sintering and bonding temperatures of up to 700° C. are reached. This posed a particular problem of preventing mirror material sublimation or diffusion.

The semireflective mirror is made of chromium evaporated on a clear sapphire window surface 34. The Chromium layer for instance has a thickness of about 5 nm. In order to further improve protection of the chromium layer from oxidation optional a protective tantalum pentoxide ($Ta_2O_5$) can be added on top of the chromium layer as protective layer.

The sapphire window is mounted with baked glass seals to the housing body in the same way as describe before for mounting the membrane.

Parallelism of the ODG Cavity

Figure 8:
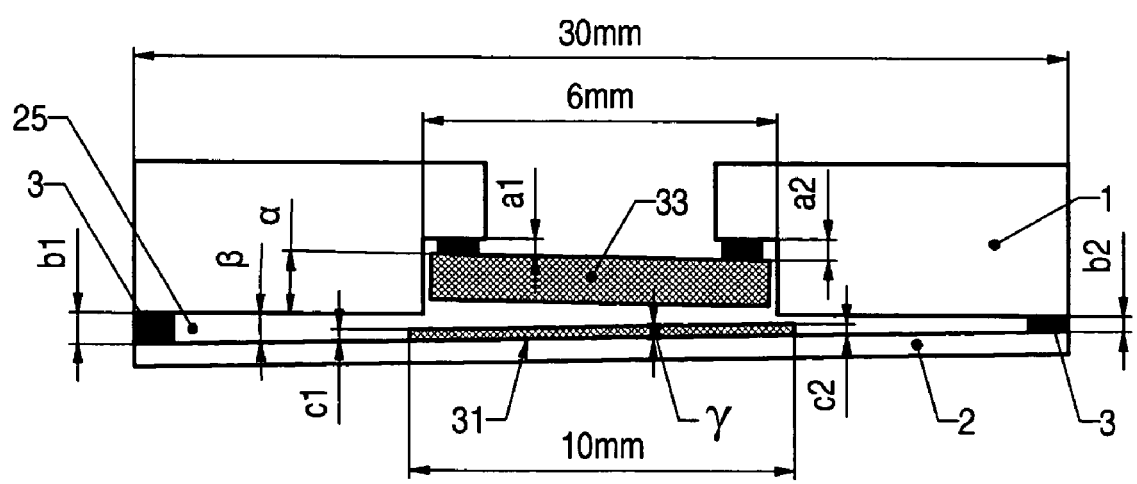
FIG. 8 is a cross section of an optical diaphragm gauge for the definition of angles of the membrane, housing body and window according to this invention.

To achieve good sensitivity the mirror 31 on the membrane 2 and the semitransparent mirror 34 in the housing body 1 need to be precisely parallel. The maximal tolerated tilt |α+β+γ| is 0.05 mrad which is difficult to achieve as shown in FIG. 8.

Baffle:

Preferably a baffle 41 is mounted in front of the sensor head and serves at least two purposes as shown in FIG. 10. First, it assures that there is no direct line of sight with the sensitive membrane 2. Gas particles therefore make at least two hits with other gauge surfaces before reaching the membrane 2. Easily condensing gases are preferably deposited on the baffle surface before the condense on the membrane surface. This reduces the sensor drift and extends the life time of the sensor. The baffle also serves to convert the plasma into gas of a low charge state, preferably neutral charge state, because of the necessary wall hit.

Figure 11:
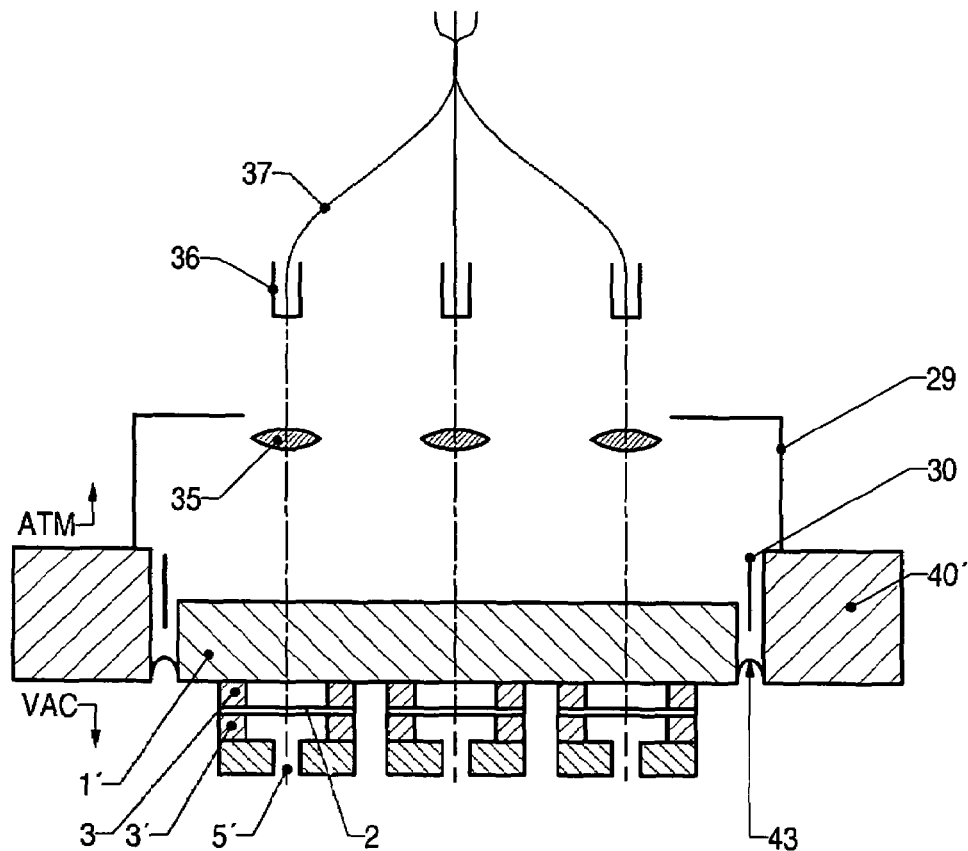
FIG. 11 a cross section of a dive in sensor arrangement with multiple sensors.

Dive in Sensor:

The ODG sensor-concept can also be used in a dive-in arrangement which is a further preferred embodiment as shown like in FIG. 11.

In this arrangement the sensor cell is not retracted from the main vacuum chamber by a tube. The sensor head can be mounted directly on a flange 40, 40'. The sensor is then immersed in the vacuum of the main vacuum chamber. Membrane and sensor housing are made of corrosion resistive materials.

Multiplexed Sensor Heads:

Optical read-out also allows for multiple sensor heads to be read out be a single spectrometer. This is achieved either using separate fibers which are stacked in parallel at the entrance slit of the spectrometer or be using bifurcated fibers or by fiber switches. The sensor heads can be at different locations in the system or in the plant.

But even more interesting is to place several sensor heads place next to each other on the same flange 40, 40'. This is shown in FIG. 11 schematically as a dive-in sensor with multiple heads. The heads can either be of same type to allow redundancy or can be made of different types to cover overlapping or adjacent pressure ranges. This allows to cover a larger range while using only one flange site at the chamber.

Previously capacitance diaphragm manometers had a dynamic range of about 4 decades. That meant in order to cover a pressure range say from $10^{-5}$ mbar to atmosphere on would need at least two different gauges, each of them using a separate vacuum chamber port. When mounting several sensors on one flange 40, 40' with holding means 43, each individual sensor heads is adapted for a different pressure range by changing membrane dimensions. Then one can measure the same pressure range while using only one port at the vacuum chamber. This is a cost reduction to the customer, since he needs less time to weld a flange and less time at interfacing sensors with his data acquisition system.

The main features of the sensor following the described invention lie in a corrosion resistant sensor design including the possibility for it's use in a high temperature high EMI (Electro Magnetic Interference) surrounding as often found on modern Semiconductor process equipment.

We claim:

1. A vacuum measuring cell comprising:
   a first housing body (1) made of $Al_2O_3$ ceramic or sapphire material;
   a membrane (2) made of $Al_2O_3$ ceramic or sapphire material and arranged proximate to said first housing body, said membrane being substantially planar and having a peripheral edge, the peripheral edge of said membrane being joined by a first edge seal to said first housing body in such a way that a reference vacuum chamber (25) is created between said first housing body and said membrane, said membrane having first and second opposing surfaces, the first surface of said membrane facing said first housing body and said first housing body having a surface facing said membrane;
   a second housing body (4) made of $Al_2O_3$ ceramic or sapphire material and located opposite said membrane (2), said second housing body (4) being joined to the peripheral edge of said membrane by a second edge seal, said second housing body together with said membrane forming a measurement vacuum chamber (26), said housing body including a port (5) for connecting the vacuum measuring cell to a medium to be measured;
   said first housing body, said second housing body and said membrane being tightly connected along the peripheral edge of said membrane; and at least in the central area of the first housing body (1) an optical transparent window (33) is formed and of this window (33) at least in the central region of the membrane (2) the surface (31) of the membrane (2) is formed optically reflective; and
   wherein, outside of the reference vacuum chamber (25) in opposition to and at a distance from the window (33), an optical fibre (37) is arranged for feeding in and out light onto the surface (31) of the membrane (2) and that a lens (35) is placed between the optical fibre (37) and the window (33) for optical linking to the surface (31) of the membrane (2) in such a way that the arrangement is forming a measuring section for determining the level of deflection of the membrane (2) by detecting with a Fabry-Perot Interferometer.

2. A measuring cell according to claim 1 wherein said membrane (2) is made from alumina ceramic $Al_2O_3$ from the type sapphire.

3. A measuring cell according to claim 1 wherein said first housing body (1) consists at least partially of alumina ceramic from the type sapphire and that this part is placed in the central area forming an optical window (33).

4. A measuring cell according to claim 3 wherein said window (33) is formed as a single insertion part made of sapphire and that it is mounted with a seal (32) vacuum tight to the first housing body (1).

5. A measuring cell according to claim 1 wherein said surface of the membrane (2) at least in the region of the reflecting area a thin film coating (31) is applied.

6. A measuring cell according to claim 5 wherein said reflective coating (31) includes mainly a noble metal.

7. A measuring cell according to claim 1 wherein said inner surface (43) of the at least partly transparent first housing body (1) or of the window (33) is covered with a partly transparent film.

8. A measuring cell according to claim 1 wherein the optical active surfaces are arranged in a high degree parallel to each other whereas the sum $|\alpha+\beta+\gamma|$ of the deviation of the angle $\alpha$ of the two opposite surfaces of the window and the deviation of the angle $\beta$ of the surface of the membrane (2) and the deviation of the angle $\gamma$ of the reflecting area of the membrane surface (31) may not exceed the total value of 0.05 mrad.

9. A measuring cell according to claim 1 wherein the purity of the alumina oxide of the membrane (2) is better than 96%.

10. A measuring cell according to claim 1 wherein said measuring cell arrangement which includes a first housing body (1), the membrane (2) and the second housing body (4) with the connecting port (5) is surrounded by a heater (30) and that this heater (30).

11. A measuring cell according to claim 1 wherein the distance of the optical fibre (37) from the window (33) is determined together with holder means (28') that the temperature at the fibre does not exceed 100° C.

12. A measuring cell according to claim 1 wherein the distance between the inner surface (34) of the first housing body (1) and the facing surface of the membrane (2) which forms together the reference vacuum chamber (25) is in the range of 2 μm to 50 μm.

13. A measuring cell according to claim 1 wherein said first housing body (1) and said second housing body (4) are symmetrically and tightly connected with the peripheral edge of said membrane (2) and mainly stress relieved.

14. A measuring cell according to claim 13 wherein the connection is made by welding or by fusion or by soldering.

15. A measuring cell according to claim 1 wherein the membrane (2) has a thickness in the range of 10 μm to 250 μm.

16. A measuring cell according to claim 15 wherein the mean grain size of the membrane material is 20 μm.

17. A measuring cell according to claim 15 wherein the membrane (2) includes at least 5 grains across the thickness of the cross-section thereof.

18. A measuring cell according to claim 1 wherein an unevenness of the membrane (2) across an entire surface of the membrane is not greater than 10 μm.

19. A measuring cell according to claim 1 where on or in the first housing body (1) a volume (13) for accommodating a getter (10) is provided which features a connection (14) to the reference vacuum chamber (25) and where the volume (13) is sealingly tightly closed with a cover (8).

20. A measuring cell according to claim 1 wherein the diameter of the cell arrangement is in the range of 5 to 80 mm.

21. A measuring cell according to claim 1 wherein said surface of the membrane (2) at least in the region of the reflecting area a thin film coating (31) is applied and that this coating is fully reflective.

22. A measuring cell according to claim 5 wherein said reflective coating (31) includes mainly a noble metal, and whereas between the membrane (2) and the reflective coating a further adhesion coating is arranged.

23. A measuring cell according to claim 1 wherein said inner surface (43) of the at least partly transparent first housing body (1) or of the window (33) is covered with a semi transparent film.

24. A measuring cell according to claim 1 wherein said measuring cell arrangement which includes a first housing body (1), the membrane (2) and the second housing body (4) with the connecting port (5) is surrounded by a heater (30) and that this heater (30) produce a measuring cell temperature in a range from 100° C. to 600° C.

* * * * *